US012580924B2

(12) United States Patent
Kida et al.

(10) Patent No.: US 12,580,924 B2
(45) Date of Patent: Mar. 17, 2026

(54) TELEMETRY RESTRICTION MECHANISM

(71) Applicant: Intel Corporation, Santa Clara, CA (US)

(72) Inventors: Luis Kida, Beaverton, OR (US); Neerav Parikh, Hillsboro, OR (US); Reshma Lal, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 273 days.

(21) Appl. No.: 17/558,966

(22) Filed: Dec. 22, 2021

(65) Prior Publication Data

US 2022/0116403 A1 Apr. 14, 2022

(51) Int. Cl.
*H04L 9/40* (2022.01)

(52) U.S. Cl.
CPC ........ *H04L 63/105* (2013.01); *H04L 63/0428* (2013.01)

(58) Field of Classification Search
CPC ..................... H04L 63/105; H04L 63/0428
USPC ............................................................. 726/1
See application file for complete search history.

(56) References Cited

U.S. PATENT DOCUMENTS 10,574,702 B1 2/2020 Rickerd et al.
2018/0063197 A1* 3/2018 Pope ................... H04L 63/0227

2020/0220713 A1 7/2020 Li et al.
2021/0160275 A1* 5/2021 Anderson ........... H04L 63/1458
2021/0194894 A1* 6/2021 Anderson ........... H04L 63/1408
2023/0198946 A1* 6/2023 Zacks ................. H04L 47/2483
726/11

FOREIGN PATENT DOCUMENTS

WO 2023121746 A 6/2023

OTHER PUBLICATIONS

International Search Report and Written Opinion for PCT Application No. PCT/US2022/046252, mailed Jan. 30, 2023, 10 pages.
Publication of CN Application No. 202280044875.4, mailed Feb. 26, 2024, 4 pages.
Non-Final Office Action issued in U.S. Appl. No. 18/756,763 mailed Sep. 22, 2025, 13 pages.

* cited by examiner

*Primary Examiner* — Linglan Edwards
*Assistant Examiner* — Phuc Pham
(74) *Attorney, Agent, or Firm* — JAFFERY WATSON HAMILTON & DESANCTIS LLP

(57) ABSTRACT

An apparatus comprising a network interface card (NIC), including packet processing circuitry to determine whether the NIC is to operate according to a first telemetry protection mode to prevent copying of packet data payloads for telemetry or a second telemetry protection mode to enable copying of packet payloads for telemetry.

16 Claims, 10 Drawing Sheets

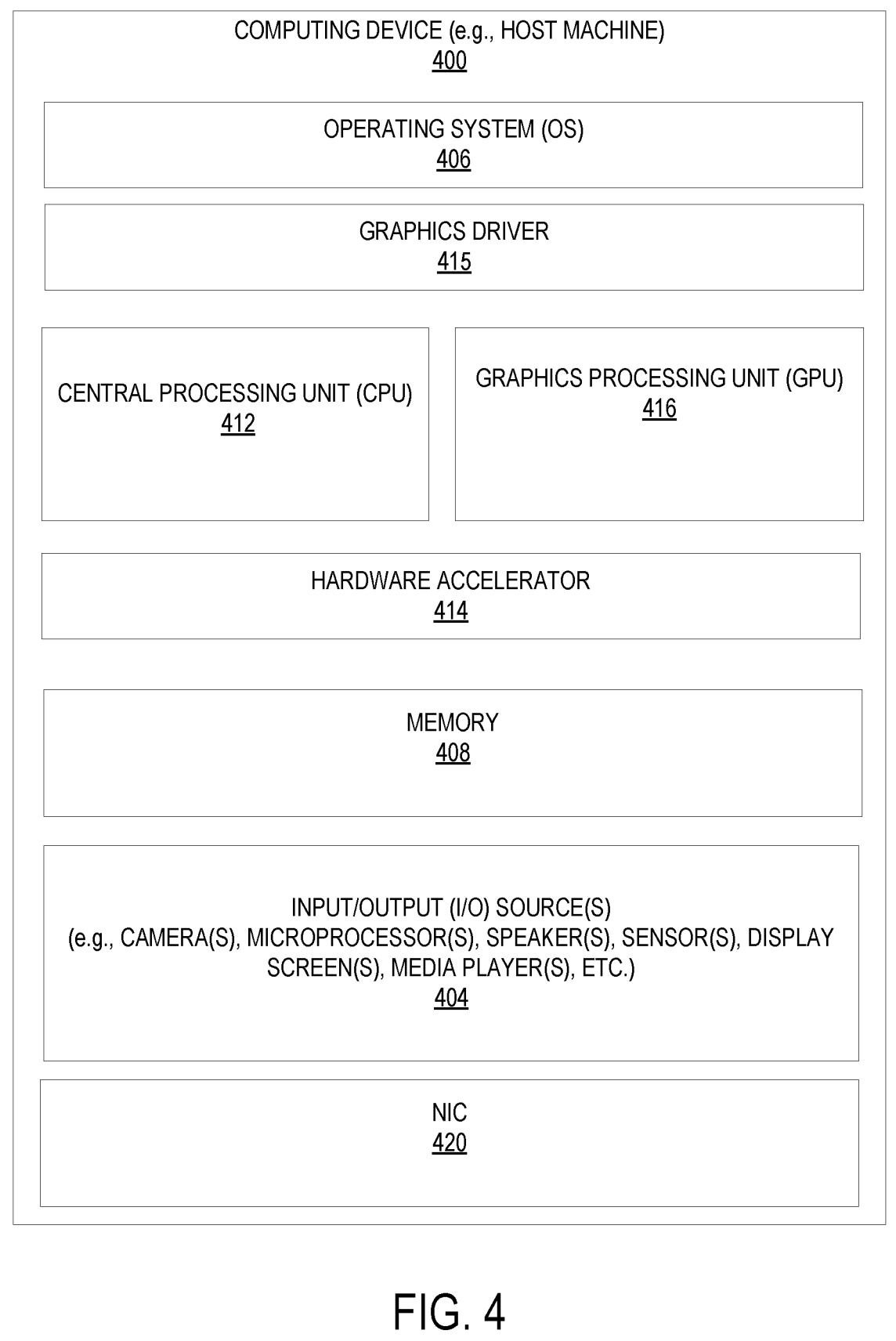

COMPUTING DEVICE (e.g., HOST MACHINE)
400

OPERATING SYSTEM (OS)
406

GRAPHICS DRIVER
415

CENTRAL PROCESSING UNIT (CPU)
412

GRAPHICS PROCESSING UNIT (GPU)
416

HARDWARE ACCELERATOR
414

MEMORY
408

INPUT/OUTPUT (I/O) SOURCE(S)
(e.g., CAMERA(S), MICROPROCESSOR(S), SPEAKER(S), SENSOR(S), DISPLAY
SCREEN(S), MEDIA PLAYER(S), ETC.)
404

NIC
420

FIG. 4

TELEMETRY RESTRICTION MECHANISM

BACKGROUND

Applications are increasingly running on public cloud datacenters, which comprises multiple platforms and devices connected in a network. Datacenter operators, such as Cloud Service Providers (CSPs) typically monitor customer network utilization in the datacenter to debug and manage congestion in the datacenter network. For this purpose, the datacenter uses a set of monitoring and observation features referred to as telemetry. One telemetry feature allows duplication, or mirroring, of the data traffic of a connection to a monitoring entity.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 4 illustrates a computing device according to implementations of the disclosure;

DETAILED DESCRIPTION

Figure 1:
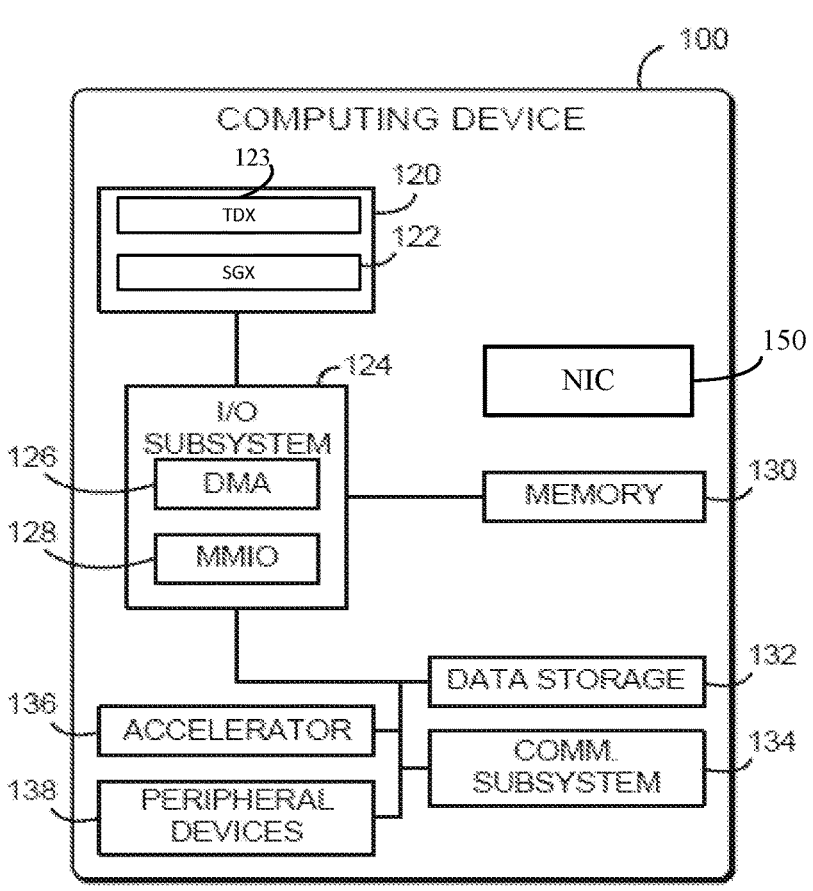
FIG. 1 is a simplified block diagram of at least one embodiment of a computing device for secure I/O with an accelerator device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims. References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a computing device 100 for secure I/O with an accelerator device includes a processor 120 and an accelerator device 136, such as a field-programmable gate array (FPGA). In use, as described further below, a trusted execution environment (TEE) established by the processor 120 securely communicates data with the accelerator 136. Data may be transferred using memory-mapped I/O (MMIO) transactions or direct memory access (DMA) transactions. For example, the TEE may perform an MMIO write transaction that includes encrypted data, and the accelerator 136 decrypts the data and performs the write. As another example, the TEE may perform an MMIO read request transaction, and the accelerator 136 may read the requested data, encrypt the data, and perform an MMIO read response transaction that includes the encrypted data. As yet another example, the TEE may configure the accelerator 136 to perform a DMA operation, and the accelerator 136 performs a memory transfer, performs a cryptographic operation (i.e., encryption or decryption), and forwards the result. As described further below, the TEE and the accelerator 136 generate authentication tags (ATs) for the transferred data and may use those ATs to validate the transactions. The computing device 100 may thus keep untrusted software of the computing device 100, such as the operating system or virtual machine monitor, outside of the trusted code base (TCB) of the TEE and the accelerator 136. Thus, the computing device 100 may secure data exchanged or otherwise processed by a TEE and an accelerator 136 from an owner of the computing device 100 (e.g., a cloud service provider) or other tenants of the computing device 100. Accordingly, the computing device 100 may improve security and performance for multi-tenant environments by allowing secure use of accelerator devices.

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 124, a memory 130, and a data storage device 132. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, which allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 130. The secure enclave support 122 may be embodied as a set of processor instruction extensions that allows the processor 120 to establish one or more secure enclaves in the memory 130. For example, the secure enclave support 122 may be embodied as Intel® Software Guard Extensions (SGX) technology. In other embodiments, processor 120 may include trusted domains (TDs) embodied as Intel® Trusted Domain Extensions (TDX) technology that is implemented to isolate virtual machines from the virtual machine monitor and other virtual machines operating on the computing device 100.

The memory 130 may be embodied as any type of volatile or non-volatile memory or data storage capable of performing the functions described herein. In operation, the memory 130 may store various data and software used during operation of the computing device 100 such as operating systems, applications, programs, libraries, and drivers. As shown, the memory 130 may be communicatively coupled to the processor 120 via the I/O subsystem 124, which may be embodied as circuitry and/or components to facilitate input/output operations with the processor 120, the memory 130, and other components of the computing device 100. For example, the I/O subsystem 124 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 130 may be directly coupled to the processor 120, for example via an integrated memory controller hub. Additionally, in some embodiments, the I/O subsystem 124 may form a portion of a system-on-a-chip (SoC) and be incorporated, along with the processor 120, the memory 130, the accelerator device 136, and/or other components of the computing device 100, on a single integrated circuit chip.

Additionally, or alternatively, in some embodiments the processor 120 may include an integrated memory controller and a system agent, which may be embodied as a logic block in which data traffic from processor cores and I/O devices converges before being sent to the memory 130.

As shown, the I/O subsystem 124 includes a direct memory access (DMA) engine 126 and a memory-mapped I/O (MMIO) engine 128. The processor 120, including secure enclaves established with the secure enclave support 122, may communicate with the accelerator device 136 with one or more DMA transactions using the DMA engine 126 and/or with one or more MMIO transactions using the MMIO engine 128. The computing device 100 may include multiple DMA engines 126 and/or MMIO engines 128 for handling DMA and MMIO read/write transactions based on bandwidth between the processor 120 and the accelerator 136. Although illustrated as being included in the I/O subsystem 124, it should be understood that in some embodiments the DMA engine 126 and/or the MMIO engine 128 may be included in other components of the computing device 100 (e.g., the processor 120, memory controller, or system agent), or in some embodiments may be embodied as separate components.

The data storage device 132 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 134, which may be embodied as any communication circuit, device, or collection thereof, capable of enabling communications between the computing device 100 and other remote devices over a computer network (not shown). The communications subsystem 134 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The accelerator device 136 may be embodied as a field-programmable gate array (FPGA), an application-specific integrated circuit (ASIC), a coprocessor, or other digital logic device capable of performing accelerated functions (e.g., accelerated application functions, accelerated network functions, or other accelerated functions), GPUs, etc. Illustratively, the accelerator device 136 is an FPGA, which may be embodied as an integrated circuit including programmable digital logic resources that may be configured after manufacture. The FPGA may include, for example, a configurable array of logic blocks in communication over a configurable data interchange. The accelerator device 136 may be coupled to the processor 120 via a high-speed connection interface such as a peripheral bus (e.g., a PCI Express bus) or an inter-processor interconnect (e.g., an in-die interconnect (IDI) or QuickPath Interconnect (QPI)), or via any other appropriate interconnect. The accelerator device 136 may receive data and/or commands for processing from the processor 120 and return results data to the processor 120 via DMA, MMIO, or other data transfer transactions.

As shown, the computing device 100 may further include one or more peripheral devices 138. The peripheral devices 138 may include any number of additional input/output devices, interface devices, hardware accelerators, and/or other peripheral devices. For example, in some embodiments, the peripheral devices 138 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

The computing device 100 may also include a network interface controller (NIC) 150. NIC 150 enables computing device 100 to communicate with another computing device 100 via a network. In embodiments, NIC 150 may comprise a programmable (or smart) NIC, infrastructure processing unit (IPU), or datacenter processing unit (DPU) that may be configured to perform different actions based on a type of packet, connection, or other packet characteristic.

Figure 2:
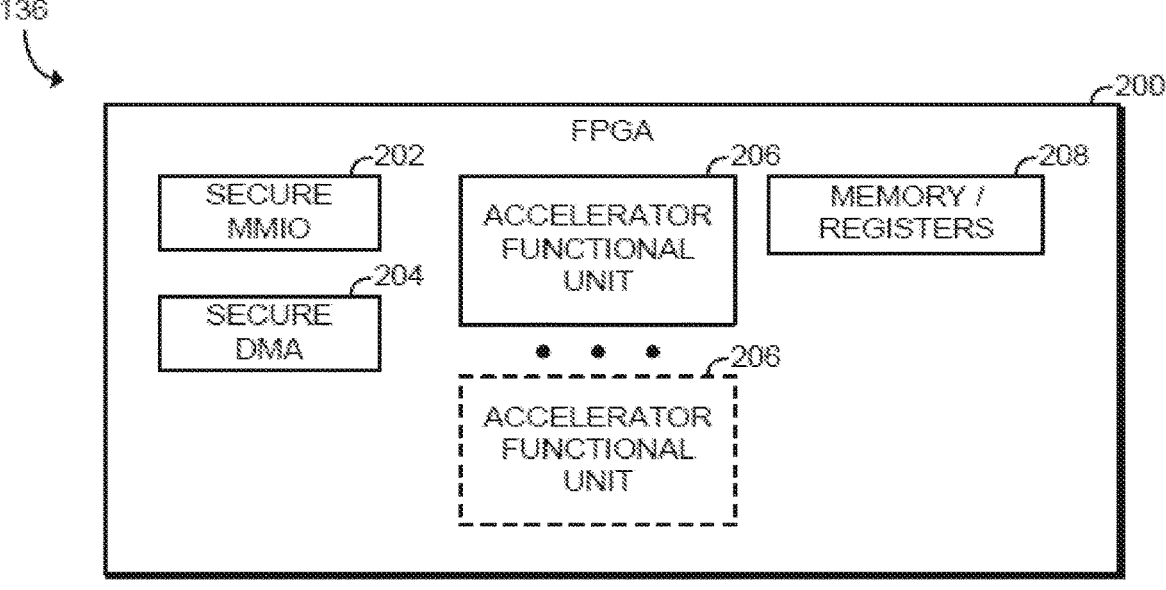
FIG. 2 is a simplified block diagram of at least one embodiment of an accelerator device of the computing device of FIG. 1.

Referring now to FIG. 2, an illustrative embodiment of a field-programmable gate array (FPGA) 200 is shown. As shown, the FPGA 200 is one potential embodiment of an accelerator device 136. The illustratively FPGA 200 includes a secure MMIO engine 202, a secure DMA engine 204, one or more accelerator functional units (AFUs) 206, and memory/registers 208. As described further below, the secure MMIO engine 202 and the secure DMA engine 204 perform in-line authenticated cryptographic operations on data transferred between the processor 120 (e.g., a secure enclave established by the processor) and the FPGA 200 (e.g., one or more AFUs 206). In some embodiments, the secure MMIO engine 202 and/or the secure DMA engine 204 may intercept, filter, or otherwise process data traffic on one or more cache-coherent interconnects, internal buses, or other interconnects of the FPGA 200.

Each AFU 206 may be embodied as logic resources of the FPGA 200 that are configured to perform an acceleration task. Each AFU 206 may be associated with an application executed by the computing device 100 in a secure enclave or other trusted execution environment. Each AFU 206 may be configured or otherwise supplied by a tenant or other user of the computing device 100. For example, each AFU 206 may correspond to a bitstream image programmed to the FPGA 200. As described further below, data processed by each AFU 206, including data exchanged with the trusted execution environment, may be cryptographically protected from untrusted components of the computing device 100 (e.g., protected from software outside of the trusted code base of the tenant enclave). Each AFU 206 may access or otherwise process stored in the memory/registers 208, which may be embodied as internal registers, cache, SRAM, storage, or other memory of the FPGA 200. In some embodiments, the memory 208 may also include external DRAM or other dedicated memory coupled to the FPGA 200.

Figure 3:
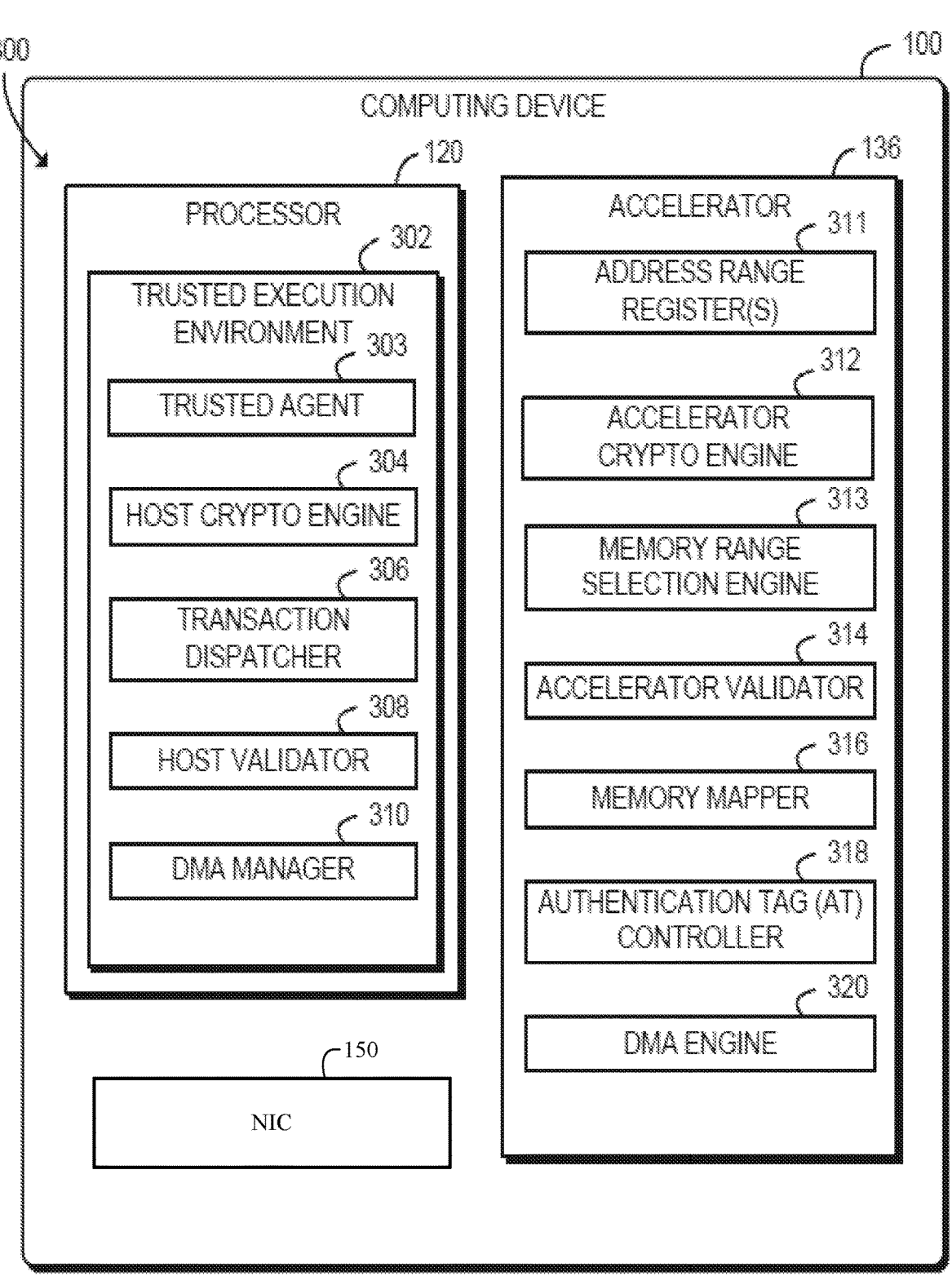
FIG. 3 is a simplified block diagram of at least one embodiment of an environment of the computing device of FIGS. 1 and 2.

Referring now to FIG. 3, in an illustrative embodiment, the computing device 100 establishes an environment 300 during operation. The illustrative environment 300 includes a trusted execution environment (TEE) 302 and the accelerator 136. The TEE 302 further includes a trusted agent 303, host cryptographic engine 304, a transaction dispatcher 306, a host validator 308, and a direct memory access (DMA) manager 310. The accelerator 136 includes an accelerator cryptographic engine 312, a memory range selection engine 313, an accelerator validator 314, a memory mapper 316, an authentication tag (AT) controller 318, and a DMA engine 320. The various components of the environment 300 may be embodied as hardware, firmware, software, or a combination thereof. As such, in some embodiments, one or more of the components of the environment 300 may be embodied as circuitry or collection of electrical devices (e.g., host cryptographic engine circuitry 304, transaction dispatcher circuitry 306, host validator circuitry 308, DMA manager circuitry 310, accelerator cryptographic engine circuitry 312, accelerator validator circuitry 314, memory mapper circuitry 316, AT controller circuitry 318, and/or DMA engine circuitry 320). It should be appreciated that, in such embodiments, one or more of the host cryptographic engine circuitry 304, the transaction dispatcher circuitry 306, the host validator circuitry 308, the DMA manager circuitry 310, the accelerator cryptographic engine circuitry 312, the accelerator validator circuitry 314, the memory mapper circuitry 316, the AT controller circuitry 318, and/or the DMA engine circuitry 320 may form a portion of the processor 120, the I/O subsystem 124, the accelerator 136, and/or other components of the computing device 100. Additionally, in some embodiments, one or more of the illustrative components may form a portion of another component and/or one or more of the illustrative components may be independent of one another.

The TEE 302 may be embodied as a trusted execution environment of the computing device 100 that is authenticated and protected from unauthorized access using hardware support of the computing device 100, such as the secure enclave support 122 of the processor 120. Illustratively, the TEE 302 may be embodied as one or more secure enclaves established using Intel® SGX technology or TDs established using Intel® TDX technology. The TEE 302 may also include or otherwise interface with one or more drivers, libraries, or other components of the computing device 100 to interface with the accelerator 136.

The host cryptographic engine 304 is configured to generate an authentication tag (AT) based on a memory-mapped I/O (MMIO) transaction and to write that AT to an AT register of the accelerator 136. For an MMIO write request, the host cryptographic engine 304 is further configured to encrypt a data item to generate an encrypted data item, and the AT is generated in response to encrypting the data item. For an MMIO read request, the AT is generated based on an address associated with MMIO read request.

The transaction dispatcher 306 is configured to dispatch the memory-mapped I/O transaction (e.g., an MMIO write request or an MMIO read request) to the accelerator 136 after writing the calculated AT to the AT register. An MMIO write request may be dispatched with the encrypted data item.

The host validator 308 may be configured to verify that an MMIO write request succeeded in response dispatching the MMIO write request. Verifying that the MMIO write request succeeded may include securely reading a status register of the accelerator 136, securely reading a value at the address of the MMIO write from the accelerator 136, or reading an AT register of the accelerator 136 that returns an AT value calculated by the accelerator 136, as described below. For MMIO read requests, the host validator 308 may be further configured to generate an AT based on an encrypted data item included in a MMIO read response dispatched from the accelerator 136; read a reported AT from a register of the accelerator 136; and determine whether the AT generated by the TEE 302 matches the AT reported by the accelerator 136. The host validator 308 may be further configured to indicate an error if those ATs do not match, which provides assurance that data was not modified on the way from the TEE 302 to the accelerator 136.

The accelerator cryptographic engine 312 is configured to perform a cryptographic operation associated with the MMIO transaction and to generate an AT based on the MMIO transaction in response to the MMIO transaction being dispatched. For an MMIO write request, the cryptographic operation includes decrypting an encrypted data item received from the TEE 302 to generate a data item, and the AT is generated based on the encrypted data item. For an MMIO read request, the cryptographic operation includes encrypting a data item from a memory of the accelerator 136 to generate an encrypted data item, and the AT is generated based on that encrypted data item.

The accelerator validator 314 is configured to determine whether the AT written by the TEE 302 matches the AT determined by the accelerator 136. The accelerator validator 314 is further configured to drop the MMIO transaction if those ATs do not match. For MMIO read requests, the accelerator validator 314 may be configured to generate a poisoned AT in response to dropping the MMIO read request, and may be further configured to dispatch a MMIO read response with a poisoned data item to the TEE 302 in response to dropping the MMIO read request.

The memory mapper 316 is configured to commit the MMIO transaction in response to determining that the AT written by the TEE 302 matches the AT generated by the accelerator 136. For an MMIO write request, committing the transaction may include storing the data item in a memory of the accelerator 136. The memory mapper 316 may be further configured to set a status register to indicate success in response to storing the data item. For an MMIO read request, committing the transaction may include reading the data item at the address in the memory of the accelerator 136 and dispatching an MMIO read response with the encrypted data item to the TEE 302.

The DMA manager 310 is configured to securely write an initialization command to the accelerator 136 to initialize a secure DMA transfer. The DMA manager 310 is further configured to securely configure a descriptor indicative of a host memory buffer, an accelerator 136 buffer, and a transfer direction. The transfer direction may be host to accelerator 136 or accelerator 136 to host. The DMA manager 310 is further configured to securely write a finalization command to the accelerator 136 to finalize an authentication tag (AT) for the secure DMA transfer. The initialization command, the descriptor, and the finalization command may each be securely written and/or configured with an MMIO write request. The DMA manager 310 may be further configured to determine whether to transfer additional data in response to securely configuring the descriptor, the finalization command may be securely written in response to determining that no additional data remains for transfer.

The AT controller 318 is configured to initialize an AT in response to the initialization command from the TEE 302. The AT controller 318 is further configured to finalize the AT in response to the finalization command from the TEE 302.

The DMA engine 320 is configured to transfer data between the host memory buffer and the accelerator 136 buffer in response to the descriptor from the TEE 302. For a transfer from host to accelerator 136, transferring the data includes copying encrypted data from the host memory buffer and forwarding the plaintext data to the accelerator 136 buffer in response to decrypting the encrypted data. For a transfer from accelerator 136 to host, transferring the data includes copying plaintext data from the accelerator 136 buffer and forwarding encrypted data to the host memory buffer in response encrypting the plaintext data.

The accelerator cryptographic engine 312 is configured to perform a cryptographic operation with the data in response to transferring the data and to update the AT in response to transferring the data. For a transfer from host to accelerator 136, performing the cryptographic operation includes decrypting encrypted data to generate plaintext data. For a transfer from accelerator 136 to host, performing the cryptographic operation includes encrypting plaintext data to generate encrypted data.

The host validator 308 is configured to determine an expected AT based on the secure DMA transfer, to read the AT from the accelerator 136 in response to securely writing the finalization command, and to determine whether the AT from the accelerator 136 matches the expected AT. The host validator 308 may be further configured to indicate success if the ATs match and to indicate failure if the ATs do not match.

According to one embodiment, NIC 150 may comprise an accelerator 136. In such an embodiment, NIC 150 operates as a network interface accelerator/controller.

FIG. 4 illustrates another embodiment of a computing device 400. Computing device 400 represents a communication and data processing device including or representing (without limitations) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet based cable television set-top boxes, etc.), global positioning system (GPS)-based devices, automotive infotainment devices, etc.

In some embodiments, computing device 400 includes or works with or is embedded in or facilitates any number and type of other smart devices, such as (without limitation) autonomous machines or artificially intelligent agents, such as a mechanical agents or machines, electronics agents or machines, virtual agents or machines, electromechanical agents or machines, etc. Examples of autonomous machines or artificially intelligent agents may include (without limitation) robots, autonomous vehicles (e.g., self-driving cars, self-flying planes, self-sailing boats, etc.), autonomous equipment self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 400 may include a computer platform hosting an integrated circuit ("IC"), such as a system on a chip ("SOC" or "SOC"), integrating various hardware and/or software components of computing device 400 on a single chip.

As illustrated, in one embodiment, computing device 400 may include any number and type of hardware and/or software components, such as (without limitation) graphics processing unit ("GPU" or simply "graphics processor") 416, graphics driver (also referred to as "GPU driver", "graphics driver logic", "driver logic", user-mode driver (UMD), user-mode driver framework (UMDF), or simply "driver") 415, central processing unit ("CPU" or simply "application processor") 412, hardware accelerator 414 (such as an FPGA, ASIC, a re-purposed CPU, or a re-purposed GPU, for example), memory 408, network devices, drivers, or the like, as well as input/output (I/O) sources 404, such as touchscreens, touch panels, touch pads, virtual or regular keyboards, virtual or regular mice, ports, connectors, etc. Computing device 400 may include operating system (OS) 406 serving as an interface between hardware and/or physical resources of the computing device 400 and a user. Computing device 400 also includes a NIC 420.

It is to be appreciated that a lesser or more equipped system than the example described above may be utilized for certain implementations. Therefore, the configuration of computing device 400 may vary from implementation to implementation depending upon numerous factors, such as price constraints, performance requirements, technological improvements, or other circumstances.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The terms "logic", "module", "component", "engine", "circuitry", "element", and "mechanism" may include, by way of example, software, hardware and/or a combination thereof , such as firmware.

Computing device 400 may host network interface device(s) to provide access to a network, such as a LAN, a wide area network (WAN), a metropolitan area network (MAN), a personal area network (PAN) , Bluetooth , a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(s). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine executable instructions that, when executed by one or more machines such as a computer, network of computers, or other electronic devices, may result in the one or more machines carrying out operations in accordance with embodiments described herein. A machine-readable medium may include, but is not limited to, floppy diskettes , optical disks, CD-ROMs (Compact Disc-Read Only Memories), and magneto-optical disks, ROMs, RAMS, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 5:
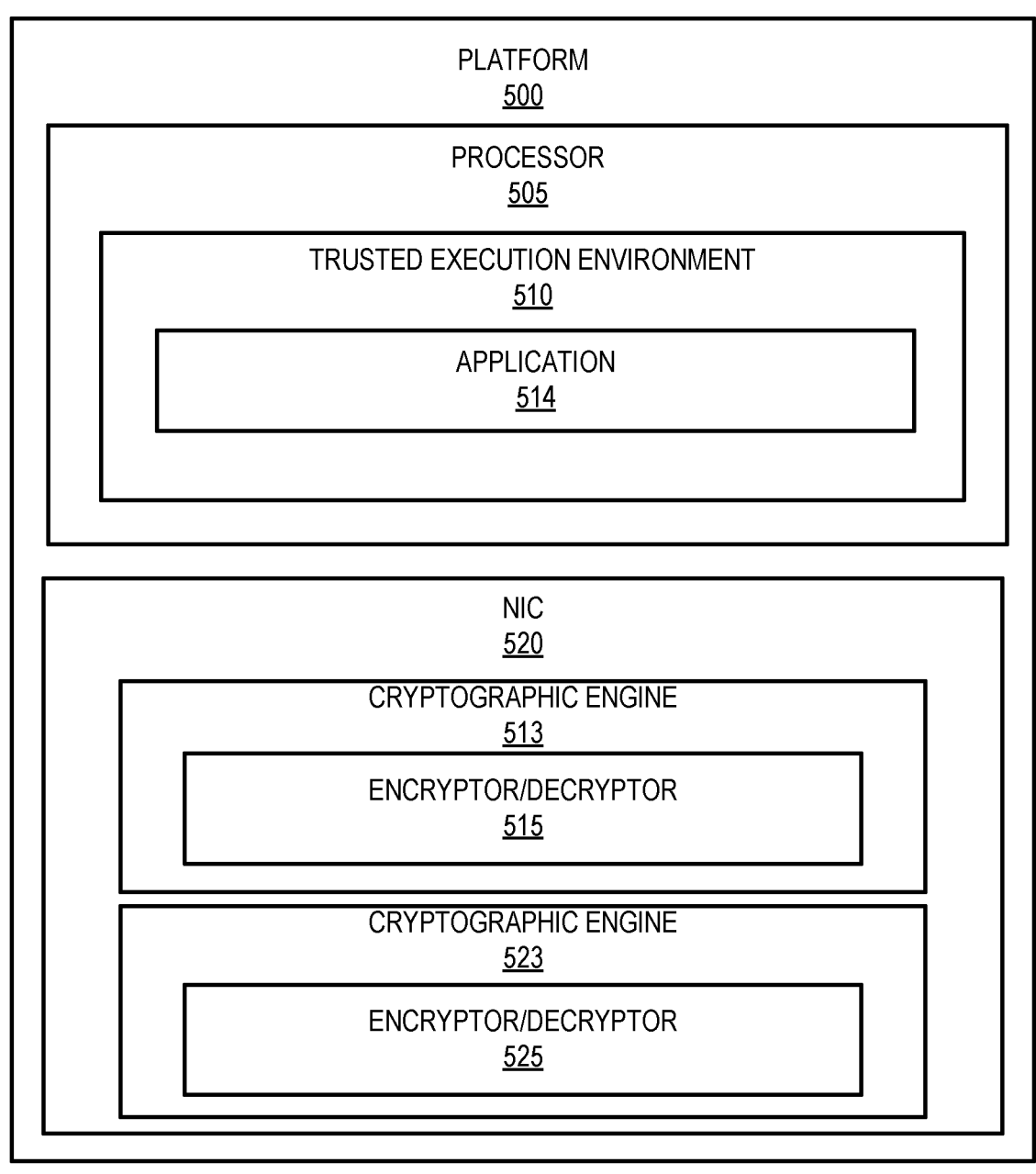
FIG. 5 illustrates one embodiment of a computing platform.

FIG. 5 illustrates a block diagram depicting a platform 500 in accordance with implementations herein. In one implementation, the illustrative platform 500 may include a processor 505 to establish a TEE 510 during operation. The platform 500 may be the same as computing device 100 described with respect to FIGS. 1 and 2, and computing device 400 in FIG. 4, for example. The establishment of the TEE 510 may be in line with the discussion above with respect to FIG. 3 of establishing a TEE and such discussion applies similarly here with respect to FIG. 5.

As illustrated, the TEE 510 further includes an application 514. The various components of the platform 500 may be embodied as hardware, firmware, software, or a combination thereof. As such, in some embodiments, one or more of the components of the platform 500 may be embodied as circuitry or collection of electrical devices. Additionally, in some embodiments, one or more of the illustrative components may form a portion of another component and/or one or more of the illustrative components may be independent of one another.

The TEE 510 may be embodied as a trusted execution environment of the platform 500 that is authenticated and protected from unauthorized access using hardware support of the platform 500. The TEE 510 may also include or otherwise interface with one or more drivers, libraries, or other components of the platform 500 to interface with an accelerator.

Platform 500 also includes a NIC 520, which may be comparable to NIC 150 discussed above. As shown in FIG. 5, NIC 520 includes a cryptographic engine 513 comprising an encryptor/decryptor 515 and a cryptographic engine 523 comprising an encryptor/decryptor 525. The cryptographic engine 513 includes encryptor/decryptor 515 that may be configured to perform a cryptographic operation associated with a data transfer transaction, such as a remote direct memory access (RDMA) transaction. For an RDMA transaction, the cryptographic operation includes encrypting a data item generated by application 514 to generate an encrypted data item, or decrypting a data item sent to application 514 to generate a decrypted data item. The cryptographic engine 523 is configured to enable protected data transfer between an application and networked devices via its components. In one embodiment, encryptor/decryptor 525 may be configured to perform cryptographic operations to secure a communications channel between NIC 520 and other platforms.

In one embodiment, a datacenter may be comprised of a network of platforms 500. As discussed above, CSPs use telemetry data to monitor (e.g., via packet duplication and mirroring) and observe data transmitted between platforms 500. However, there is no current limitation on what data the CSP may mirror. Thus, the owners of the data processed in an application must trust the CSP with preserving the confidentiality of the data, or encrypt the data in the TEE if they don't trust the CSP, as is the case for confidential computing. However, encryption performed in the TEE consumes resources that the CSP could otherwise supply to data center customers.

According to one embodiment, NIC 520 may be implemented to prevent the forwarding packets of telemetry with data that is determined to be confidential. In such an embodiment, a restricted data copy mirror mode indicates that only statistical information (e.g., length of the payload in the original packet), or no data, is to be included in a mirror packet payload. In a further embodiment, the restricted data copy mirror mode may be locked to change to the state of the mirror mode to enable some forms of telemetry to be monitored. In a further embodiment, the state of enablement of the restricted data copy mirror mode may be reported to TEE 510 for attestation. In still a further embodiment, an application 514 (or tenant) may setup NIC 520 to automatically disconnect secure channels of application 514 upon detecting an indication that the restricted data copy mirror mode has been changed to a permissive mode, which enables the mirroring of tenant data for telemetry.

Figure 6:
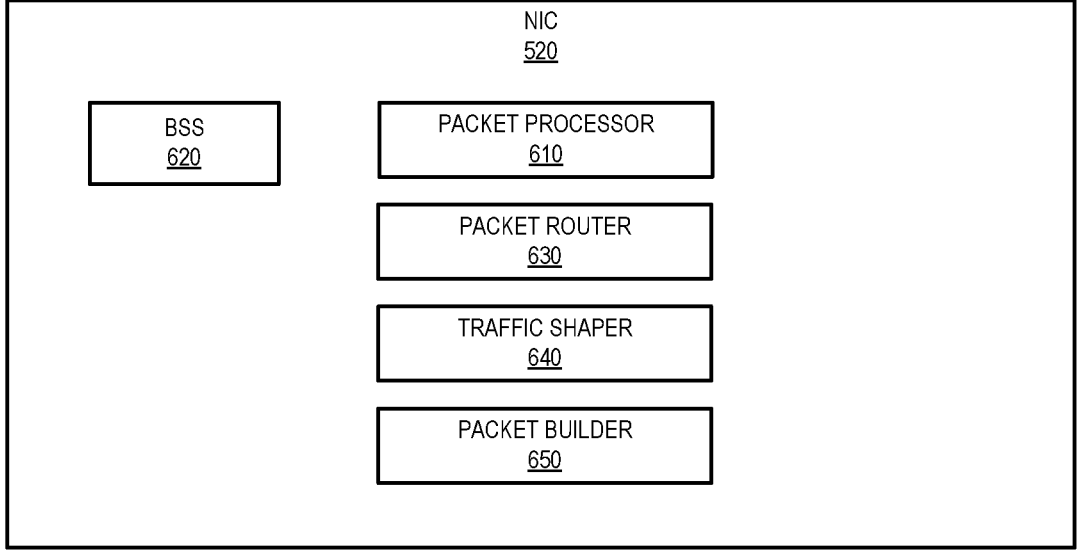
FIG. 6 illustrates one embodiment of a network interface controller.

According to one embodiment, NIC 520 may be a programmable (or smart) NIC, infrastructure processing unit (IPU), or datacenter processing unit (DPU) that may be configured to perform different actions based on a type of packet, connection, or other packet characteristic. In such an embodiment, NIC 520 comprises a programmable packet processing pipeline that accelerates packet classification of the and performs a programmed action to facilitate high line rates. FIG. 6 illustrates one embodiment of a NIC 520.

As shown in FIG. 6, NIC 520 includes a packet processing pipeline that classifies packets traveling from a network, processes the packets and directs the packet to destination per configuration (e.g., programming). In a further embodiment, telemetry is implemented in the packet processing pipeline. As used herein, telemetry refers to telemetry data defined as performance, configuration and other system data of a monitored system. Telemetry data may refer to one data point or a range of data points. Non-limiting examples of telemetry data include latency, utilization, a number of input-output operations (TOPS), Quality of Service (QoS) settings, or any other performance related information.

In one embodiment, the packet processing pipeline includes a packet processor 610. Packet processor 610 comprises a programmable (or configurable) packet processor that processes packets received via a network. In one embodiment, packet processor 610 classifies the packets and modifies, adds or removes information that the other components in the pipeline use to further process the packet.

In conventional pipeline packet processing of data received from a network, packet processor 610 is programmed to duplicate and forward packets received from a network to a telemetry consumer (e.g., a CSP). As a result, packet processor 610 identifies packets that are target for telemetry, adds headers and modifies metadata that a body segment storage (BSS) 620 uses to create the copies of a packet. Subsequently, BSS 620 deallocates memory after all copies have been sent. A packet router 630 then routes the mirrored packets to the telemetry consumer specified by packet processor 610. In one embodiment, data in a packet header is used by packet router 630 to direct a packet to its destination, where the packet payload is extracted and used (e.g., by an OS, an application or higher level protocols).

Additionally, the packet processing pipeline is used to read data from application 514 operating in TEE 510 (or host) to generate packets (e.g., RDMA). In this embodiment, the packet processing pipeline may be programmed to duplicate and forward packets that will be transmitted through the network to other platforms to be used for telemetry monitoring. Thus, packet processor 610 identifies packets to duplicate and creates the duplicate headers that cause downstream modules in the pipeline to create packets for telemetry. A traffic shaper 640 and packet builder 650 process the duplicate of the traffic packet and route the telemetry packet to the telemetry consumer. In a further embodiment, packet builder 650 reads data from memory via a connection to platform 500 hardware (e.g., a Peripheral Component Interconnect Express (PCIe)) to add the payload to the packet.

Figure 7:
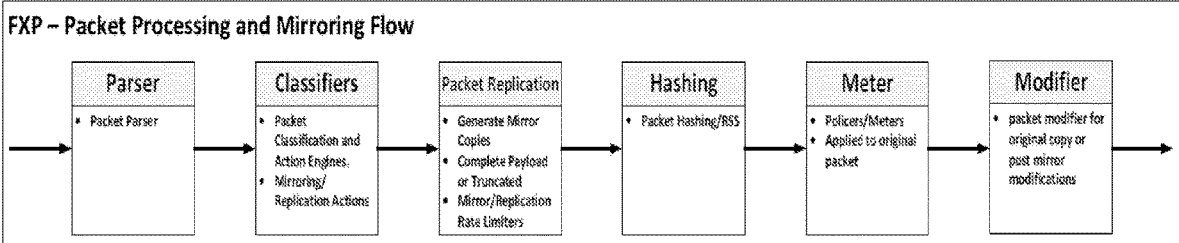
FIG. 7 illustrates an exemplary packet processing flow.

FIG. 7 illustrates an exemplary packet processing and mirroring flow performed by a NIC. As shown in FIG. 7, the flow includes packet parsing, packet classification and mirroring actions, packet replication (e.g., generate mirror copies, complete payload or truncated), packet hashing, metering and packet modification (e.g., for packet modifier for original copy or post mirror modifications).

As discussed above, there is currently no efficient mechanism for a tenant to prevent confidential data from being duplicated/mirrored and transmitted to a telemetry consumer. According to one embodiment, packet processor 610 is modified to facilitate implementation of a restricted data copy mirror mode to prevent the packet processing pipeline from copying data payload for transmission in telemetry operations.

Figure 8:
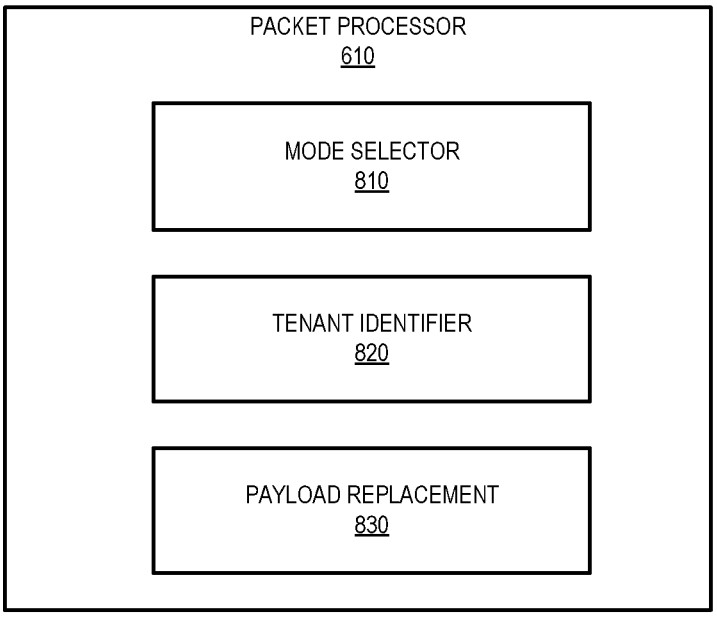
FIG. 8 illustrates one embodiment of a packet processor.

FIG. 8 illustrates one embodiment of packet processor 610, including mode selector 810, tenant identifier 820 and payload replacement logic 830. Mode selector 810 selects a mode in which packet processor 610 is to operate. In one embodiment, packet processor 610 may operate in a restricted data copy mirror mode to prevent the packet processing pipeline from copying data payload of packets. Packet processor 610 may also operate in a permissive mode to enable the packet processing pipeline to duplicate and transmit payload data to a telemetry consumer, as discussed above.

In one embodiment, mode selector 810 may receive a message from a tenant indicating one or more network connections associated with the tenant that are to be considered a confidential (or confidential connections). In such an embodiment, the message is transmitted from the tenant to the mode selector in a manner such that message's integrity is preserved. This transmission may be performed using cryptographic means to protect the message (e.g., using as in encrypted and integrity protected MMIO or DMA described above). Alternatively, the transmission may be program by a trusted delegate with special access to configure the mode settings.

According to one embodiment, confidential connections operate in the restricted data copy mirror mode that restricts copy of payload, while non-confidential connections operate in the permissive mode that allows a copy of original data payload to be included in the duplicated packets. In this embodiment, mode configuration is stored in tamper proof storage, such as access controlled registers or memory. As a result, the tenants can control access to tenant's data payload in telemetry packet mirroring for all packets associated with confidential connections.

In additional embodiments, the restricted data copy mirror mode may be implemented to prevent telemetry packet mirroring for all received packets associated with confidential tenants. In further embodiments, there may be various restricted data copy mirror modes, each associated with a different restriction level. These modes may be offered by CSPs for tenant to select or could be set of industry standard that compliant NICs implement.

Although discussed above with reference to confidential and non-confidential connections, other embodiments may operate at the tenant level, such that confidential tenants operate in the restricted data copy mirror mode and non-confidential tenants operate in the permissive mode. In this embodiment, all connections associated with a tenant are defined as either confidential or non-confidential based on the tenant classification.

Tenant identifier 820 examines packets to identify whether a packet is associated with a confidential connection. In one embodiment, tenant identifier 820 identifies the type of a connection (or type of tenant in confidential tenant embodiments). In such an embodiment, tenant identifier 820 identifies a protection level for telemetry for the tenant and/or connection by determining the packet destination and mapping the destination to the tenant or a connection associated with the tenant. In a further embodiment, tenant identifier 820 includes a table including an entry that indicates whether a tenant and/or connection is identified as confidential. In such an embodiment, the table is programmed securely (e.g., with integrity) and is access controlled to allow only the tenant or a trusted delegate of the tenant to modify or delete the table. A trusted delegate can be software or firmware executing on host or NIC (or combination) and has strong identity enabling enforcement of access control.

Although described herein as preventing the data payload of received packets associated with confidential tenants from being copied, other embodiments may implement the restricted data copy mirror mode such that the data payload of all packets received at NIC 520 are prevented from being copied. In further embodiments, the restricted data copy mirror mode may also restrict the gathering of statistics data (e.g., size of packets, frequency of packet transmission, etc.) to prevent potential leakage through side channels.

Payload replacement logic 830 is implemented whenever NIC 520 is operating in the restricted data copy mirror mode. In one embodiment, payload replacement logic 830 generates a replacement packet that replaces the payload of an original packet with an empty payload that is transmitted to the telemetry user as telemetry data. However, in another embodiment, payload replacement logic 830 may generate the replacement packet to include a statistics payload comprising statistics of the original packet, which is used to replace a mirrored/duplicated packet transmitted to the telemetry data. In such an embodiment, payload replacement logic 830 analyzes a received packet and generates the statistics to be included in the replacement packet. In a further embodiment, the payload replacement logic 830 generates the statistics by extracting statistics data (e.g., length of the original payload in bits or bytes) that are to be included in the replacement packet. Although discussed above with reference to packet processor 610, the mirror mode processing may be performed at any combination of packet processor 610 and/or traffic shaper 640 and packet builder 650 within the packet processing pipeline.

Figure 9A:
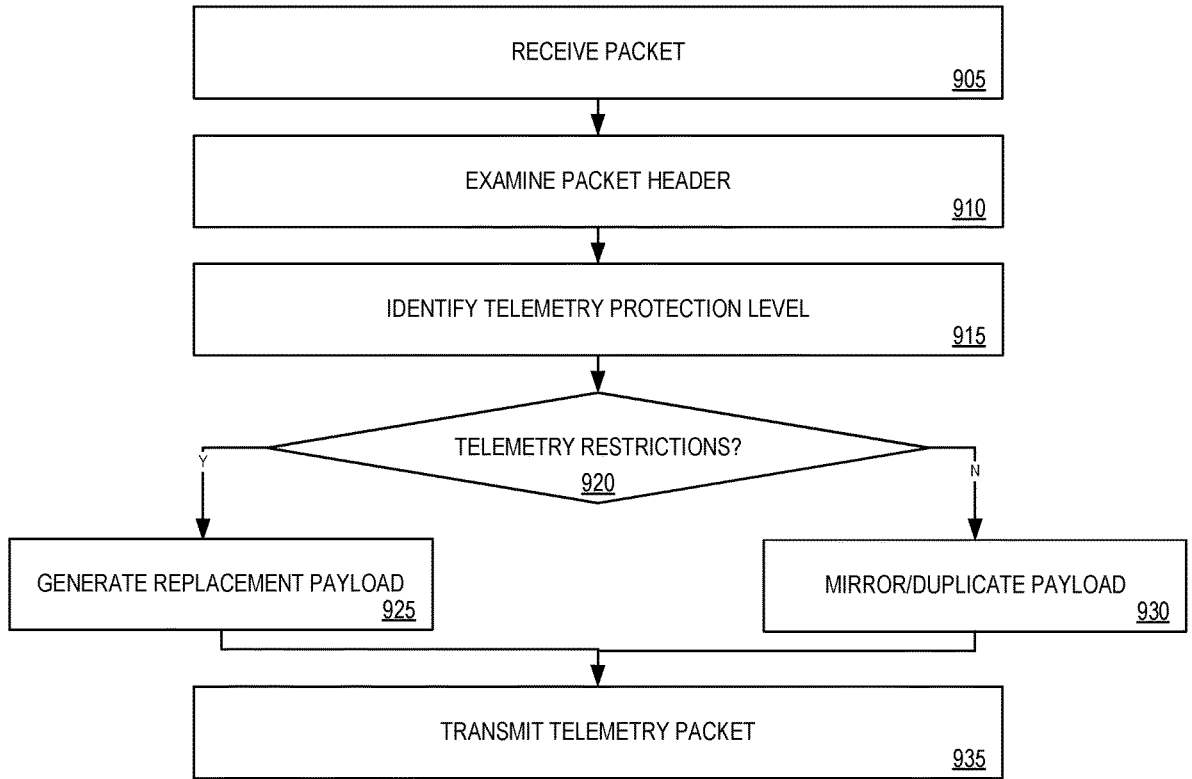
FIGS. 9A & 9B are flow diagrams illustrating embodiments of packet processing.

FIG. 9A is a flow diagram illustrating one embodiment of packet processing for generating telemetry data for packets received via the network. At processing block 905, a packet is received at the NIC in the network. As discussed above, the packet may be a part of a packet stream received from another platform via network. At processing block 910, the packet header is examined. At processing block 915, the protection level for telemetry for the tenant and/or connection for an original packet to be created is identified. As discussed above, this is determined based on the original packet destination. At decision block 920, a determination is made as to whether the identified tenant/destination connection requested restrictions on telemetry.

Upon a determination that telemetry restrictions have been requested, a telemetry packet is generated including a replacement payload, processing block 925. As mentioned above, the replacement payload may include an empty payload or a statistics payload comprising statistics of the original packet. Upon a determination that telemetry restrictions have not been requested, a telemetry packet is generated including a duplicate of the payload of the original packet , processing block 930. At processing block 935, a telemetry packet is transmitted to the telemetry consumer. Thus, the telemetry packet may be transmitted as either replacement packet or duplicate packet, depending upon whether the tenant is a confidential tenant.

Figure 9B:
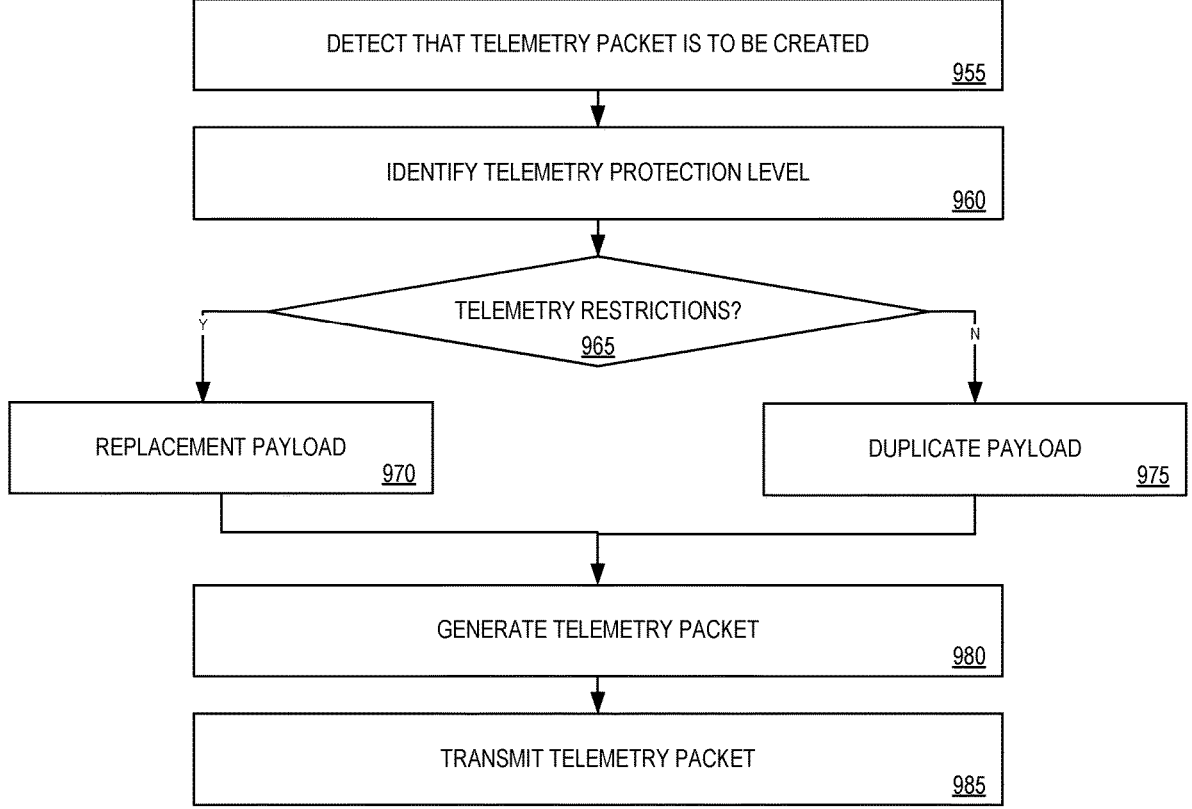

FIG. 9B is a flow diagram illustrating one embodiment of packet processing for generating telemetry data for transmitted packets. At processing block 955, the packet processing pipeline detects that a telemetry packet is to be created and transmitted to a telemetry consumer. At processing block 960, the protection level for telemetry for the tenant and/or connection of the original packet is identified. As discussed above, the tenant or connection is identified based on the sender, destination or connection identifier included in the packet header. At decision block 965, a determination is made as to whether the identified tenant/destination connection requested restrictions on telemetry. If so, the telemetry header specifies a replacement payload, processing block 970. Otherwise, the header specifies the creation of the same (or duplicate) payload as the original packet, processing block 975. At processing block 980, the packet is generated according to the header. At processing block 985, a telemetry packet is transmitted to the telemetry consumer.

Although described above as operating in packet processor, similar telemetry restriction for packet mirroring modes may be configured and enforced in other parts of the packet processing pipeline. For example, a special mode associated with confidential computing sessions may restrict type or telemetry data that can be collected at a cryptographic engine 523, which may perform encryption/decryption of networks packets.

Figure 10:
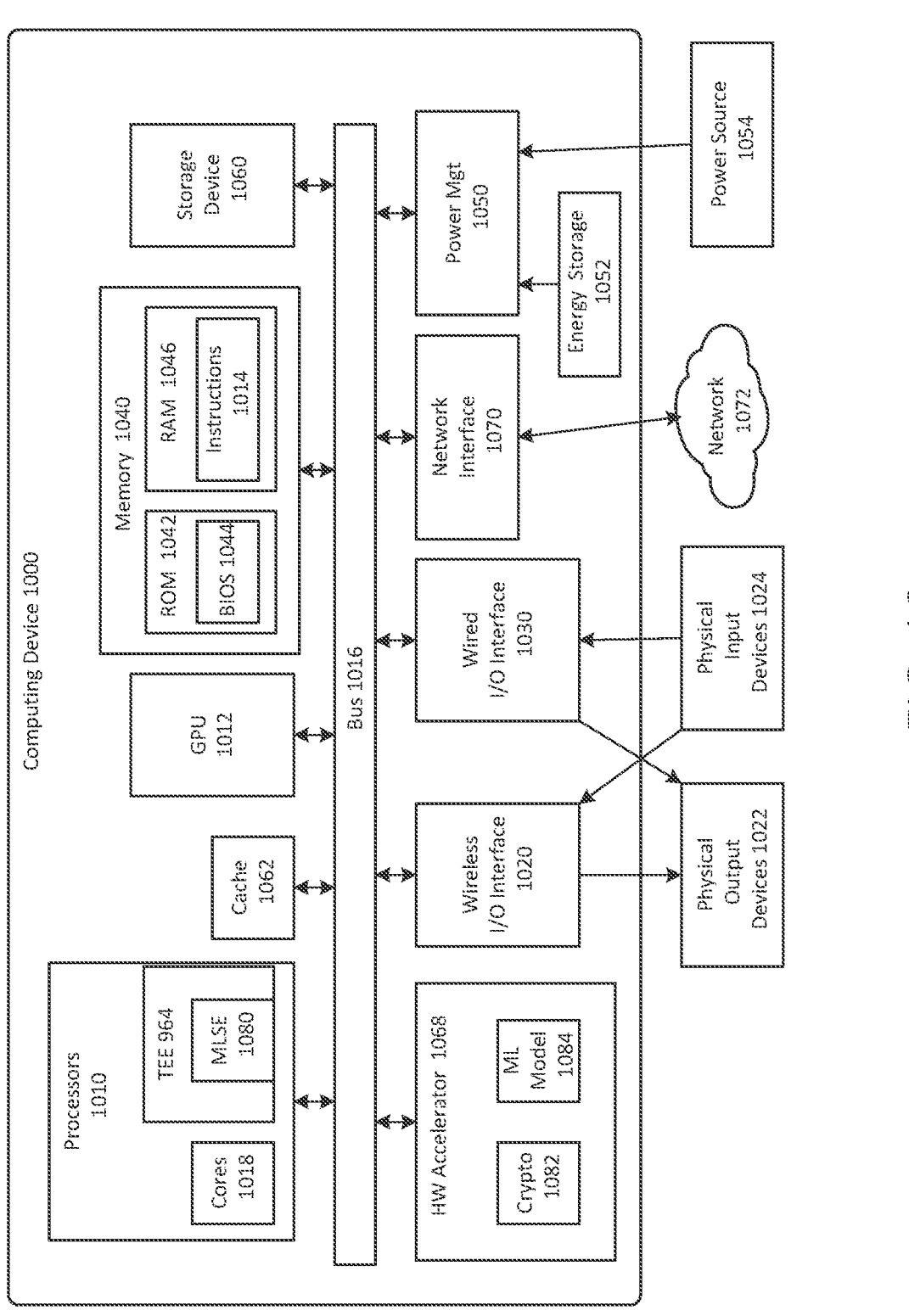
FIG. 10 illustrates one embodiment of a schematic diagram of an illustrative electronic computing device.

FIG. 10 is a schematic diagram of an illustrative electronic computing device to enable enhanced protection against adversarial attacks according to some embodiments. In some embodiments, the computing device 1000 includes one or more processors 1010 including one or more processors cores 1018 and a Trusted Execution Environment (TEE) 1064, the TEE including a machine learning service enclave (MLSE) 1080. In some embodiments, the computing device 1000 includes a hardware accelerator (HW) 1068, the hardware accelerator including a cryptographic engine 1082 and a machine learning model 1084. In some embodiments, the computing device is to provide enhanced protections against ML adversarial attacks, as provided in FIGS. 1-9.

The computing device 1000 may additionally include one or more of the following: cache 1062, a graphical processing unit (GPU) 1012 (which may be the hardware accelerator in some implementations), a wireless input/output (I/O) interface 1020, a wired I/O interface 1030, memory circuitry 1040, power management circuitry 1050, non-transitory storage device 1060, and a network interface 1070 for connection to a network 1072. The following discussion provides a brief, general description of the components forming the illustrative computing device 1000. Example, non-limiting computing devices 1000 may include a desktop computing device, blade server device, workstation, or similar device or system.

In embodiments, the processor cores 1018 are capable of executing machine-readable instruction sets 1014, reading data and/or instruction sets 1014 from one or more storage devices 1060 and writing data to the one or more storage devices 1060. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 1018 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 1000 includes a bus or similar communications link 1016 that communicably couples and facilitates the exchange of information and/or data between various system components including the processor cores 1018, the cache 1062, the graphics processor circuitry 1012, one or more wireless I/O interfaces 1020, one or more wired I/O interfaces 1030, one or more storage devices 1060, and/or one or more network interfaces 1070. The computing device 1000 may be referred to in the singular herein, but this is not intended to limit the embodiments to a single computing device 1000, since in certain embodiments, there may be more than one computing device 1000 that incorporates, includes, or contains any number of communicably coupled, collocated, or remote networked circuits or devices.

The processor cores 1018 may include any number, type, or combination of currently available or future developed devices capable of executing machine-readable instruction sets.

The processor cores 1018 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 10 are of conventional design. Consequently, such blocks need not be described in further detail herein, as they will be understood by those skilled in the relevant art. The bus 1016 that interconnects at least some of the components of the computing device 1000 may employ any currently available or future developed serial or parallel bus structures or architectures.

The system memory 1040 may include read-only memory ("ROM") 1042 and random access memory ("RAM") 1046. A portion of the ROM 1042 may be used to store or otherwise retain a basic input/output system ("BIOS") 1044. The BIOS 1044 provides basic functionality to the computing device 1000, for example by causing the processor cores 1018 to load and/or execute one or more machine-readable instruction sets 1014. In embodiments, at least some of the one or more machine-readable instruction sets 1014 cause at least a portion of the processor cores 1018 to provide, create, produce, transition, and/or function as a dedicated, specific, and particular machine, for example a word processing machine, a digital image acquisition machine, a media playing machine, a gaming system, a communications device, a smartphone, or similar.

The computing device 1000 may include at least one wireless input/output (I/O) interface 1020. The at least one wireless I/O interface 1020 may be communicably coupled to one or more physical output devices 1022 (tactile devices, video displays, audio output devices, hardcopy output devices, etc.). The at least one wireless I/O interface 1020 may communicably couple to one or more physical input devices 1024 (pointing devices, touchscreens, keyboards, tactile devices, etc.). The at least one wireless I/O interface 1020 may include any currently available or future developed wireless I/O interface. Example wireless I/O interfaces include, but are not limited to: BLUETOOTH®, near field communication (NFC), and similar.

The computing device 1000 may include one or more wired input/output (I/O) interfaces 1030. The at least one wired I/O interface 1030 may be communicably coupled to one or more physical output devices 1022 (tactile devices, video displays, audio output devices, hardcopy output devices, etc.). The at least one wired I/O interface 1030 may be communicably coupled to one or more physical input devices 1024 (pointing devices, touchscreens, keyboards, tactile devices, etc.). The wired I/O interface 1030 may include any currently available or future developed I/O interface. Example wired I/O interfaces include, but are not limited to: universal serial bus (USB), IEEE 1394 ("FireWire"), and similar.

The computing device 1000 may include one or more communicably coupled, non-transitory, data storage devices 1060. The data storage devices 1060 may include one or more hard disk drives (HDDs) and/or one or more solid-state storage devices (SSDs). The one or more data storage devices 1060 may include any current or future developed storage appliances, network storage devices, and/or systems. Non-limiting examples of such data storage devices 1060 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 1060 may include one or more removable storage devices, such as one or more flash drives, flash memories, flash storage units, or similar appliances or devices capable of communicable coupling to and decoupling from the computing device 1000.

The one or more data storage devices 1060 may include interfaces or controllers (not shown) communicatively coupling the respective storage device or system to the bus 1016. The one or more data storage devices 1060 may store, retain, or otherwise contain machine-readable instruction sets, data structures, program modules, data stores, databases, logical structures, and/or other data useful to the processor cores 1018 and/or graphics processor circuitry 1012 and/or one or more applications executed on or by the processor cores 1018 and/or graphics processor circuitry 1012. In some instances, one or more data storage devices 1060 may be communicably coupled to the processor cores 1018, for example via the bus 1016 or via one or more wired communications interfaces 1030 (e.g., Universal Serial Bus or USB); one or more wireless communications interfaces 1020 (e.g., Bluetooth®, Near Field Communication or NFC); and/or one or more network interfaces 1070 (IEEE 802.3 or Ethernet, IEEE 802.11, or Wi-Fi®, etc.).

Processor-readable instruction sets 1014 and other programs, applications, logic sets, and/or modules may be stored in whole or in part in the system memory 1040. Such instruction sets 1014 may be transferred, in whole or in part, from the one or more data storage devices 1060. The instruction sets 1014 may be loaded, stored, or otherwise retained in system memory 1040, in whole or in part, during execution by the processor cores 1018 and/or graphics processor circuitry 1012.

The computing device 1000 may include power management circuitry 1050 that controls one or more operational aspects of the energy storage device 1052. In embodiments, the energy storage device 1052 may include one or more primary (i.e., non-rechargeable) or secondary (i.e., rechargeable) batteries or similar energy storage devices. In embodiments, the energy storage device 1052 may include one or more supercapacitors or ultracapacitors. In embodiments, the power management circuitry 1050 may alter, adjust, or control the flow of energy from an external power source 1054 to the energy storage device 1052 and/or to the computing device 1000. The power source 1054 may include, but is not limited to, a solar power system, a commercial electric grid, a portable generator, an external energy storage device, or any combination thereof.

For convenience, the processor cores 1018, the graphics processor circuitry 1012, the wireless I/O interface 1020, the wired I/O interface 1030, the storage device 1060, and the network interface 1070 are illustrated as communicatively coupled to each other via the bus 1016, thereby providing connectivity between the above-described components. In alternative embodiments, the above-described components may be communicatively coupled in a different manner than illustrated in FIG. 10. For example, one or more of the above-described components may be directly coupled to other components, or may be coupled to each other, via one or more intermediary components (not shown). In another example, one or more of the above-described components may be integrated into the processor cores 1018 and/or the graphics processor circuitry 1012. In some embodiments, all or a portion of the bus 1016 may be omitted and the components are coupled directly to each other using suitable wired or wireless connections.

Illustrative examples of the technologies disclosed herein are provided below. An embodiment of the technologies may include any one or more, and any combination of, the examples described below.

Example 1 includes an apparatus comprising a network interface card (NIC), including packet processing circuitry to determine whether the NIC is to operate according to a first telemetry protection mode to prevent copying of packet data payloads for telemetry or a second telemetry protection mode to enable copying of packet payloads for telemetry.

Example 2 includes the subject matter of Example 1, wherein the packet processing circuitry to receives a message from a tenant indicating a telemetry protection mode to be associated with one or more network connections associated with the tenant.

Example 3 includes the subject matter of any of Examples 1-2, wherein the packet processing circuitry to receive a packet via a network, examine a header of the packet and determine a telemetry protection mode associated with the packet.

Example 4 includes the subject matter of any of Examples 1-3, wherein the packet processing circuitry determines the telemetry protection mode based on a destination of the packet.

Example 5 includes the subject matter of any of Examples 1-4, wherein the packet processing circuitry to generate a telemetry packet including a replacement payload upon determining that the packet is associated with the first telemetry protection mode.

Example 6 includes the subject matter of any of Examples 1-5, wherein the replacement payload comprises empty payload data.

Example 7 includes the subject matter of any of Examples 1-6, wherein the replacement payload comprises statistics payload data.

Example 8 includes the subject matter of any of Examples 1-7, wherein the packet processing circuitry to generate a telemetry packet including a duplicate payload of the packet upon determining that the packet is associated with the second telemetry protection mode.

Example 9 includes the subject matter of any of Examples 1-8, wherein the packet processing circuitry to transmit the telemetry packet as a telemetry packet to a telemetry consumer.

Example 10 includes the subject matter of any of Examples 1-9, wherein the packet processing circuitry to receive data from a host and determine that a telemetry packet is to be generated.

Example 11 includes the subject matter of any of Examples 1-10, wherein the packet processing circuitry to determine the telemetry protection mode associated with a packet to be transmitted.

Example 12 includes the subject matter of any of Examples 1-11, wherein the packet processing circuitry to generate a header specifying a telemetry packet including a replacement payload upon determining that the packet is associated with the first telemetry protection mode.

Example 13 includes the subject matter of any of Examples 1-12, wherein the packet processing circuitry to generate a header specifying a telemetry packet including a duplicate payload of the packet upon determining that the packet is associated with the second telemetry protection mode.

Example 14 includes a method comprising receiving a packet via a network, determining the telemetry protection mode based on a destination of the packet and generating a telemetry packet including a replacement payload upon determining that the packet is associated with a first telemetry protection mode.

Example 15 includes the subject matter of Example 14, wherein the replacement payload comprises empty payload data.

Example 16 includes the subject matter of any of Examples 14-15, wherein the replacement payload comprises statistics payload data.

Example 17 includes the subject matter of any of Examples 14-16, further comprising generating a telemetry packet including a duplicate payload of the packet upon determining that the packet is associated with a second telemetry protection mode.

Example 18 includes the subject matter of any of Examples 14-17, further comprising transmitting the telemetry packet to a telemetry consumer.

Example 19 includes at least one computer readable medium having instructions stored thereon, which when executed by one or more processors, cause the processors to receive a packet via a network, determine the telemetry protection mode based on a destination of the packet and generate a telemetry packet including a replacement payload upon determining that the packet is associated with a first telemetry protection mode.

Example 20 includes the subject matter of Example 19, having instructions stored thereon, which when executed by one or more processors, further cause the processors to generate a telemetry packet including a duplicate payload of the packet upon determining that the packet is associated with a second telemetry protection mode.

Example 21 includes the subject matter of any of Examples 19-20, having instructions stored thereon, which when executed by one or more processors, further cause the processors to transmit the telemetry packet to a telemetry consumer.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition, "a set of" includes one or more elements. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," etc. are used merely as labels, and are not intended to suggest a numerical order for their objects.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:

a network interface card (NIC), including packet processing circuitry to receive a packet from a tenant via a network, process the packet to examine a message indicating whether one or more network connections associated with the tenant is to operate as a confidential connection and enable the NIC to operate according to a first telemetry protection mode to prevent duplication and mirroring of telemetry packet data payloads upon determining that the message indicates that the one or more network connections are to operate as the confidential connection, wherein a telemetry protection mode including the first telemetry protection mode or a second telemetry protection mode is determined based on a destination of the packet, wherein the packet processing circuitry to generate a telemetry packet for telemetry monitoring, the telemetry packet including a replacement payload upon determining that the packet is associated with the first telemetry protection mode, wherein the replacement payload substitutes an original payload of the telemetry packet while preventing duplication of the replacement payload.

2. The apparatus of claim 1, wherein the packet processing circuitry further to enable the NIC to operate according to the second telemetry protection mode to enable duplication and mirroring of telemetry packet data payloads upon determining that the message indicates that the one or more network connections are not to operate as the confidential connection.

3. The apparatus of claim 2, wherein the packet processing circuitry to receive data from a host and determine that the telemetry packet is to be generated.

4. The apparatus of claim 3, wherein the packet processing circuitry is further to determine the telemetry protection mode associated with a packet to be transmitted.

5. The apparatus of claim 4, wherein the packet processing circuitry is further to generate a header specifying the telemetry packet including a replacement payload upon determining that the packet is associated with the first telemetry protection mode.

6. The apparatus of claim 5, wherein the packet processing circuitry to generate a header specifying the telemetry packet including the duplicate payload of the packet upon determining that the packet is associated with the second telemetry protection mode.

7. The apparatus of claim 1, wherein the replacement payload comprises empty payload data.

8. The apparatus of claim 7, wherein the replacement payload comprises statistics payload data.

9. The apparatus of claim 7, wherein the packet processing circuitry to generate the telemetry packet that includes a duplicate payload of the packet upon determining that the packet is associated with the second telemetry protection mode.

10. The apparatus of claim 9, wherein the packet processing circuitry to transmit the telemetry packet to a telemetry consumer.

11. A method comprising:

receiving a packet via a network;

processing the packet, wherein processing includes:

examining a header within the packet to determine a destination of the packet;

determining that the destination is associated with one or more confidential connections associated with a tenant based on the destination of the packet;

preventing duplication and mirroring of telemetry packet data payloads upon determining that the destination is associated is associated with the one or more confidential connections, wherein a telemetry protection mode including a first telemetry protection mode or a second telemetry protection mode is determined based on the destination of the packet; and generating a telemetry packet for telemetry monitoring, the telemetry packet including a duplicate payload of the packet upon determining that the packet is associated with the second telemetry protection mode, wherein the replacement payload substitutes an original payload of the telemetry packet while preventing duplication of the replacement payload.

12. The method of claim 11, further comprising generating the telemetry packet including a replacement payload including empty payload data.

13. The method of claim 11, wherein the replacement payload comprises statistics payload data.

14. The method of claim 11, further comprising transmitting the telemetry packet to a telemetry consumer.

15. At least one non-transitory computer readable medium having instructions stored thereon, which when executed, cause a computing device to perform operations comprising:

receiving a packet via a network;

processing the packet, including:

examining a header within the packet to determine a destination of the packet;

determining that the destination is associated with one or more confidential connections associated with a tenant based on the destination of the packet;

preventing duplication and mirroring of telemetry packet data payloads upon determining that the destination is associated is associated with the one or more confidential connections, wherein a telemetry protection mode including a first telemetry protection mode or a second telemetry protection mode is determined based on the destination of the packet; and generating a telemetry packet for telemetry monitoring, the telemetry packet including a replacement payload including empty payload data, wherein the replacement payload substitutes an original payload of the telemetry packet while preventing duplication of the replacement payload.

16. The computer readable medium of claim 15, wherein the operations further comprise generating the telemetry packet including a duplicate payload of the packet upon determining that the packet is associated with the second telemetry protection mode.

* * * * *